United States Patent [19]

Goodland

[11] 4,223,445
[45] Sep. 23, 1980

[54] CARPENTRY MEASURING TOOL

[76] Inventor: John L. Goodland, 7 Bradshaw St., Medford, Mass. 02155

[21] Appl. No.: 23,466

[22] Filed: Mar. 23, 1979

[51] Int. Cl.³ ............................................. E06B 3/00
[52] U.S. Cl. ..................................... 33/194; 33/472; 33/500
[58] Field of Search ................ 33/194, 143 G, 147 K, 33/161, 465, 471, 472, 495–500

[56] References Cited

U.S. PATENT DOCUMENTS

| | | | |
|---|---|---|---|
| 509,582 | 11/1893 | Ort | 33/194 |
| 841,627 | 1/1907 | Cloud | 33/497 |
| 1,066,606 | 7/1913 | Hansen | 33/194 |
| 3,328,887 | 7/1967 | Wright | 33/161 |

*Primary Examiner*—Charles E. Phillips
*Attorney, Agent, or Firm*—Weingarten, Maxham & Schurgin

[57] ABSTRACT

A carpentry measuring tool including two arms pivotally connected at adjoining ends thereof. The two arms are angularly adjustable with respect to one another, and are adapted for determining the angle formed between the interior portions of intersecting horizontal and vertical surfaces of a door or window frame. One of the arms is provided with an extendable slide portion on the end thereof and is adapted for measuring the distance between interior portions of opposed surfaces of the frame. The distal end of the slide portion contains a spring biased heel which may be retracted for removal of the one arm from within the door or window jam. The angular relationship of the two arms and the length of the one arm may be fixed so that these measurements may be transferred to a door or window which is to be hung in a measured door or window frame. Slidable clips or plates along the exterior portions of the other arm are particularly suited for use with doors and are adapted to be extended from the other arm to permit proper alignment of the measuring tool along one edge of the door for accurate marking of the desired dimensions thereon and for an automatic predetermined reduction of the door width.

5 Claims, 9 Drawing Figures

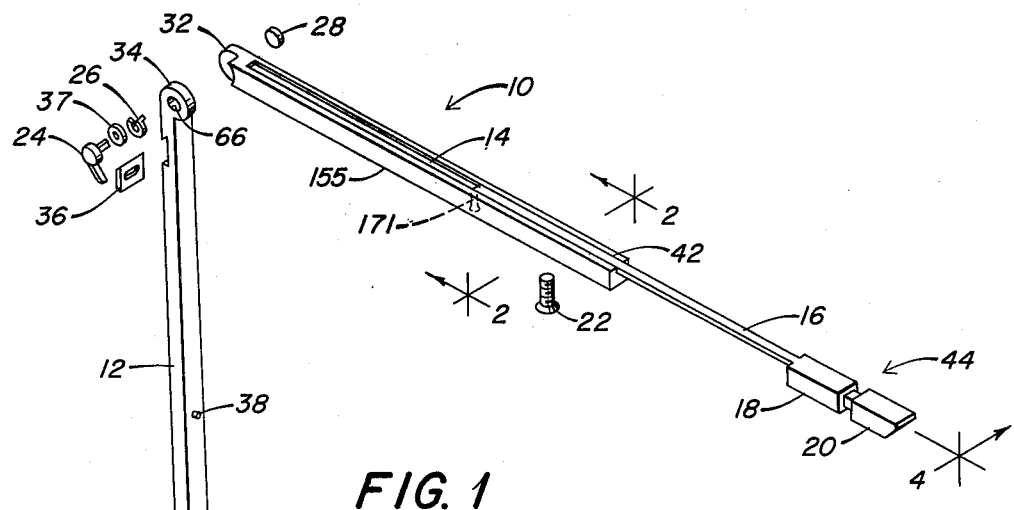
FIG. 1
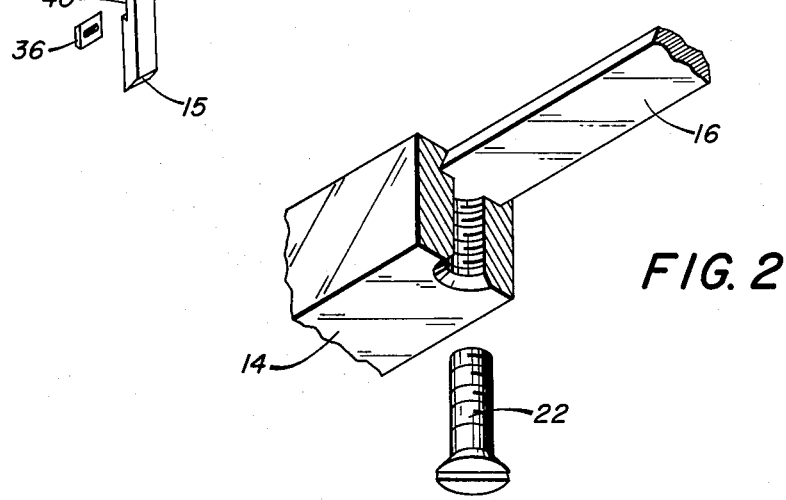
FIG. 2
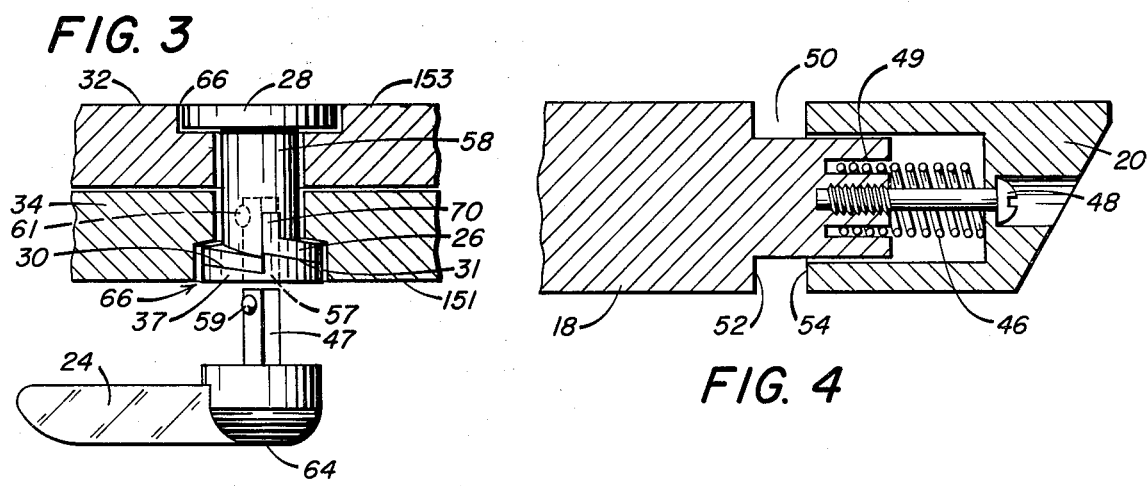
FIG. 3
FIG. 4

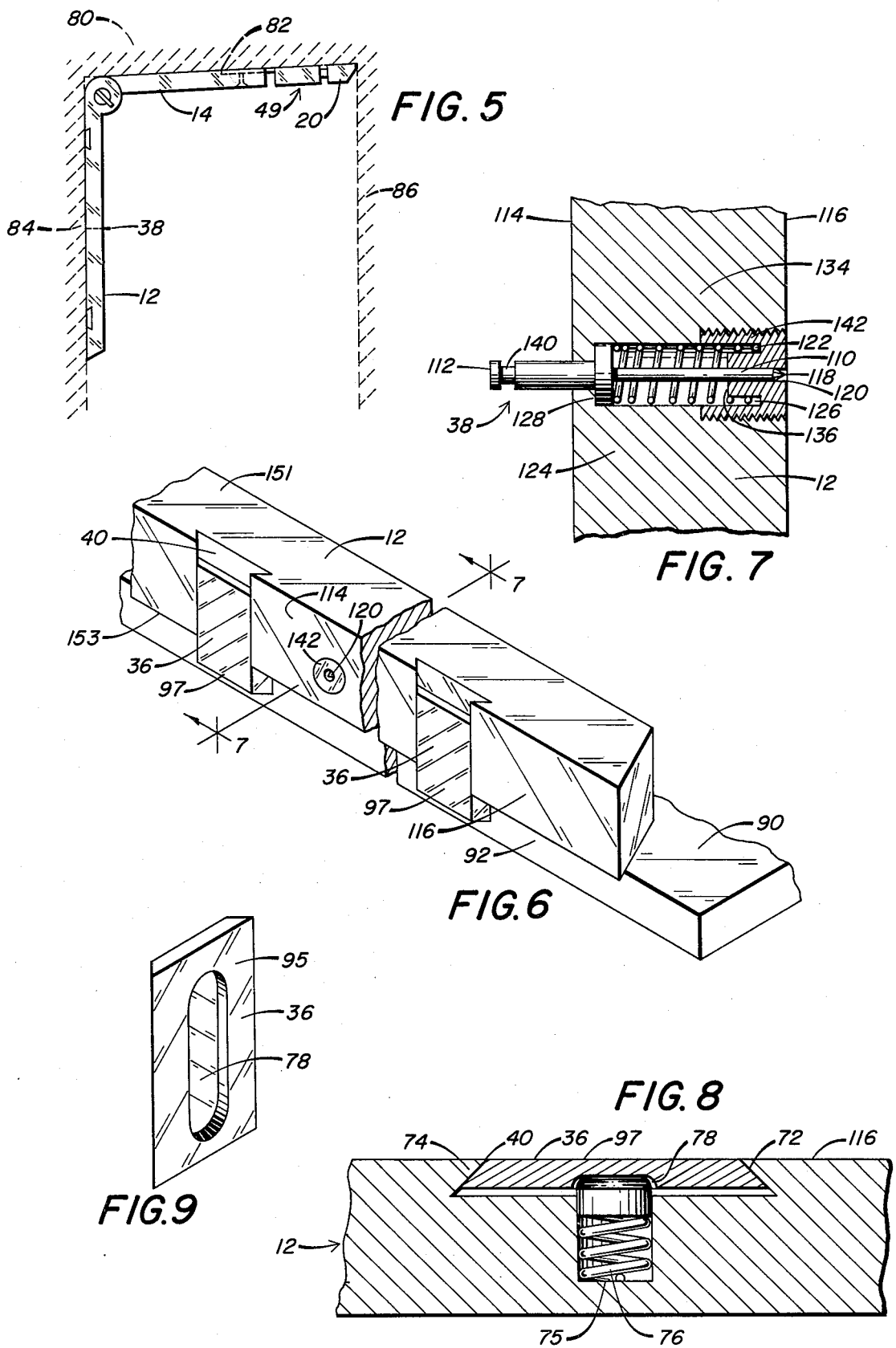

CARPENTRY MEASURING TOOL

FIELD OF THE INVENTION

This invention relates generally to carpentry measuring tools and is more particularly concerned with a tool used for measuring the angular relationship and dimensions of the sides of an opening, such as a window or door frame, to permit the fitting of a workpiece, such as a window or door, to be mounted therein.

DISCUSSION OF THE PRIOR ART

In large carpentry jobs wherein it is desired to fit a workpiece to an existing opening, generally two people are required to mark and cut the workpiece to the appropriate size. Often, the process must be repeated several times until a precise fit is obtained. One particular example of this type of operation is the fitting of a new door or window to an existing door or window frame. The door or window must be held up to the frame by one person while another person marks the door or window for subsequent conformal cutting thereof. Prior art compasses or straight edges generally permit either the measuring of the angle between horizontal and vertical portions of the frame or the measuring of the width of the frame. These devices are awkward to use and do not adequately perform both of the above described measuring functions. Often two people are required to use such a compass, a T square or other measuring device, one holding the device in place with the other adjusting it to the proper angle or the proper distance. Examples of such prior devices are shown in U.S. Pat. Nos. 2,837,826; 840,628; 832,483; 2,042,213; 2,689,406; and 3,942,252. None of the above-cited prior art measuring devices are specifically designed for fitting doors or windows to existing door or window frames, and none is designed to be easily handled by one person for that or a similar use.

SUMMARY OF THE INVENTION

Broadly speaking, this invention is concerned with a carpentry measuring tool which is adapted for measuring both the distances between opposed interior surfaces and the angles formed by intersecting interior surfaces. A preferred embodiment of the invention is adapted for fitting a new door or window to an existing door or window frame which is either not vertically true or whose members are joined to form an angle other than 90°. Two arms pivotally connected at adjointing ends thereof are adjustable to form any desired angle therebetween. One of the arms has a slide portion disposed on the distal end thereof which is extensible in a direction along a line defined by said arm. The slide may be extended to any desired length to measure the interior distance between two opposed surfaces, such as the distance between the side jams of a door or window frame. A spring-biased heel at a distal end of the slide is retractable to permit removal of the tool from a position between the two opposed surfaces. Tensioning means on the slide permits the slide to be retained at the measured distance so that the distance may be transferred onto another surface, such as a door or window. Another tensioning means, disposed at the junction of the first arm and the second arm, permits the two arms to be locked in the measured angular position so that the angle may be transferred to another surface such as a door or window for marking. A handle on the other tensioning means is removable, thus permitting measurement of angles in any tight location, as at the bottom of a door or window frame, and the transfer thereof to any surface regardless of which side of the tool must be placed on the surface to transfer the measurement.

Slidably mounted clips or plates along side portions of the other arm may be extended to catch an edge of the surface upon which the angle and the distance is to be marked. Where the application of the tool is for the fitting of a door to a door frame, the clips are positioned such that the other arm overlaps the edge of the surface a desired amount, so that the door width is reduced sufficiently to permit opening and closing of the door within the door frame. A spring-loaded nail means housed within the other arm may be driven into the appropriate portion of the frame to retain the tool in a position tightly abutting a surface of the frame, so that the necessary angular and distance measurements may be easily made.

The use of the invention permits one person to measure a frame, mark the door or window and mount it without the necessity of another person to assist him. This invention greatly accelerates the process of mounting a door or window to an existing frame and it also provides a more precise fit of the door or window to the frame than is presently permitted by tools available in the prior art.

BRIEF DESCRIPTION OF THE DRAWING

The objects, advantages and features of this invention will be more clearly appreciated from the following detailed description when taken in conjunction with the accompanying drawing in which:

FIG. 1 is an exploded perspective view of one embodiment of the tool of this invention;

FIG. 2 is a perspective cross-sectional view along lines 2—2 of the embodiment of this invention shown in FIG. 1;

FIG. 3 is a cross-sectional view of the tensioning means of the embodiment shown in FIG. 1;

FIG. 4 is a cross-sectional view of the spring-biased heel shown in the embodiment of FIG. 1;

FIG. 5 is a pictoral view of the use of the embodiment of this invention shown in FIG. 1;

FIG. 6 is a perspective view of the detail of one arm of the embodiment of this invention shown in FIG. 1;

FIG. 7 is a cross-sectional view of the nail means of the embodiment of this invention as shown in FIG. 1;

FIG. 8 is a cross-sectional view of the detail of the arm of this invention shown in FIG. 6; and FIG. 9 is a pictorial view of one of the clips shown in FIG. 8.

DETAILED DESCRIPTION OF THE PREFERRED EMBODIMENT

With reference now to the drawings and more particularly to FIGS. 1, 2, 3, 4, 8 and 9 thereof, there is shown a measuring tool 10 comprising elongate straight arms 12 and 14 which are pivotally connected at end portions 34 and 32, respectively. Extensible portion 44 of arm 14 is mounted on the distal end thereof and includes slide 16 which is captured within dove-tail groove 42, as shown in FIG. 2. Slide 16 may be locked in a desired position by bolt 22 which has a head projecting from a hole on surface 155 and which tensions slide 16 against overlapping portions of groove 42. A block 18 mounted on the distal end of slide 16 has a spring-biased heel 20 having a truncated bevel formed on the outwardly facing end thereof. As shown in FIG. 4, heel 20 is affixed to block 18 by means of screw 48, and is biased away therefrom by spring 46 which is mounted in annular recess 49 and which creates a space 50 between confronting shoulders 52 and 54 on block 18 and heel 20, respectively. A force applied longitudinally to heel 20 acts to compress spring 46 into recess 49 and to drive shoulder 54 against shoulder 52. Once such a force is removed, spring 46 returns heel 20 to the position shown in FIG. 4.

The distal end 15 of arm 12 has a truncated bevel similar to that of heel 20. Arm 12 is pivotally joined to arm 14 at ends 34 and 32, respectively, as shown in FIG. 3. Pin 58 extends through holes 66 formed in ends 32 and 34 and terminates in a disk or nut 28 in end 32. Nut 28 is preferably recessed into end 32 so that its exterior surface is at least flush with exterior surface 153 of end 32. Pin 58 is attached at its other termination to disc 37 recessed into end 34 so that its exterior is flush with the outer surface 151 of end 34. An opposed interior surface of disc 37 is shaped to form a sloped cam surface 30. Imbedded into end 34 and coaxial with pin 58 is spiral lock washer 26. Lock washer 26 has formed thereon cam surface 31 which is in engagement with and conforms in shape to cam surface 30. Finger 70 projects from an end of lock washer 26 into portions of end 34 to prevent rotational movement of lock washer 26. Cam surface 30 on disc 37 is adapted to ride along cooperating cam surface 31 on lock washer 26.

A handle 24 has a square peg 47 which is insertable into a mating square hole 57 in disc 37. Peg 47 is provided with a spring biased ball bearing 59 which engages a mating depression 61 formed in hole 57 to retain peg 47 therein. Handle 24 may be attached to disc 37 merely by clamping peg 47 into hole 57, and it may be easily removed by a strong pull. Pin 58 is rotatable by the lateral application of pressure to handle 24. When handle 24 is rotated in a clockwise direction in FIGS. 1 and 3, pin 58, disc 37 and nut 28 rotate therewith. Cam surface 30 rides up along cam surface 31 to force surfaces of end 32 against surfaces of end 34 as handle 24 and disc 37 move away from end 32 and draw nut 28 toward end 32. This tensioning of handle 24 locks arms 12 and 14 into a desired angular relationship.

A portion of arm 12 containing plates or clips 36 is shown in FIGS. 6 and 8. Clips 36 are captured within dove-tailed slots 40 along beveled edges 72 by overlapping sloped surfaces 74. Springs 76 captured between depression 75 within arm 12 and a depression 78 formed on a confronting surface 95 of clips 36, as shown in FIG. 9, serve to bias edges 72 against surfaces 74. This biasing action of spring 76 acts to retain clips 36 in a desired position. The exposed surface 97 of clips 36 is preferably flush with the outer surface 116 of arm 12. Clips 36 are laterally slidable within slots 40, this lateral movement being restricted to predetermined limits by the projection of spring 76 into depression 78. Clips 36 may be slid laterally in either of two directions by the application of force thereto to project beyond either edge of arm 12. Surfaces 95 on clips 36 are placed flush with the edge of a work surface upon which the tool 10 is placed to permit the proper alignment of the tool on the workpiece. Since handle 24 is removable, either side of the tool 10 may be laid upon the work surface and thus, the clips 36 may be slid to project from either surface 151 or 153 facing the work surface to grip the edge thereof.

In the embodiment of this invention shown in FIGS. 5 and 6 wherein a door 90 is fit to an existing door frame 80, clips 36 have a predetermined thickness which causes arm 12 to overhang edge 92 of the door 90 an equivalent amount. As a result, the door 90 is marked with a width that is less than that of the door frame 80 by an amount equal to the predetermined thickness. This predetermined thickness is equal to the difference between the width of the door 90 and the frame 80 which is necessary to permit the proper opening and closing of the door within the frame.

A spring-loaded nail attachment device 38 is mounted in arm 12 as shown in FIG. 7. A nail 110 has a head 112 projecting from surface 114 of arm 12, and a pointed end 118 projectable from a hole 120 in opposite surface 116 of arm 12. Nail 110 is biased by means of coiled spring 122 towards surface 114 so that pointed end 118 is normally retained within hole 120. Spring 122 is captured within cylindrical cavity 134 between circular retainer 124 on nail 110 and annular recess 126 and serves to urge retainer 124 against shoulder 128. When nail 110 is driven to the right in FIG. 7 towards surface 116 by the application of force to head 112, retainer 124 is permitted to slide through cavity 134 from left to right in FIG. 7 until it abuts cylindrical shoulder 136 within annular recess 126. At the same time, pointed end 118 is driven outwardly through hole 120 and into the desired external surface, and spring 122 is compressed into recess 126. Recess 126 is preferably sufficiently deep to accommodate the entire length of spring 122 when it is fully compressed. Head 112 is provided with a circumferential notch 140 which permits the head 112 to be grasped by a tool by withdraw nail 110 and thus pointed end 118 from the surface into which it was driven. When pointed end 118 has been withdrawn, spring 122 acts to return nail 110 to the position shown in FIG. 7 in which head 112 projects above surface 114 and retainer 124 abuts shoulder 128.

Cavity 134 preferably has approximately the same diameter as that of retainer 124 so that retainer 124 fits snugly therein. Spring 122 and recess 126 preferably also have the same diameter as retainer 124. Device 38 is preferably inserted by boring a hole equal to the diameter of head 112 through surface 114. Another hole having a diameter equal to that of cavity 134 is counterbored from surface 116. A threaded hole coaxial with cavity 134 and having a diameter equal to that of cylindrical plug 142 is bored from surface 116. The threaded hole has a depth equal to the length of plug 142. Plug 142, which is provided with screw threads and which contains recess 126, hole 120 and shoulder 136, is then screwed into arm 12 until the outer surface thereof is flush with surface 116.

A recess 171 is disposed on surface 155 of arm 14 directly opposite head 112 on arm 12. Recess 171 is of a sufficient diameter and depth to receive head 112 when head 112 is normally projecting from surface 114. Recess 171 permits surface 114 of arm 12 to be placed flush against surface 155 of arm 14 so that tool 10 may be collapsed for storage.

The operation of one embodiment of this invention will now be discussed with reference to FIGS. 4 and 5. Measuring tool 10 may be used to measure the width of the top or bottom of an existing door or window frame 80 and the angle formed by surfaces 82 and 84 thereof, so that a workpiece 90, such as a window or door, may be fitted thereto. Arm 12 is placed flush against surface 84, and arm 14 is placed flush against surface 82. Nail device 38 may be driven into surface 84 to retain arm 12 in a fixed position with respect to surfaces 82 and 84.

Slide 44 is then extended until the truncated bevel portion of heel 20 firmly abuts surface 86 without compression of spring 46. Peg 47 is inserted into hole 57 and handle 24 is rotated until ends 32 and 34 are tensioned against each other, and arms 12 and 14 are prevented from moving with respect to one another. Bolt 22 is tightened to prevent further movement of slide 44. Nail device 38 is then withdrawn from surface 84 and heel 20 is momentarily retracted by the longitudinal application of pressure thereto to drive shoulder 54 against shoulder 52. Tool 10 may then be removed from frame 80 without alteration of the measurements previously obtained. The tool is then placed on workpiece 90, which in this embodiment would be a new door to be mounted on frame 80. Clips 36 are slid to overhang edge 92 so that arm 12 may be properly aligned with respect thereto. The proper width of the door and the angle formed by surfaces 82 and 84 are then marked on the door. The door is now ready for conformal cutting to the frame 80. Only one person is required to perform all the necessary measurements and to properly mark and cut the door. This invention permits the door to be precisely cut and mounted with a minimum expenditure of time. This same operation may be performed to measure the bottom of a door or window frame. In that instance, when the tool 10 is placed on the workpiece 90, surface 151 must be flush against the surface thereof, so handle 24 must first be removed from disc 37.

It should be noted that when arms 12 and 14 are extended to form an angle of 180° therebetween, the tool may be used as a straight edge. A linear scale may be provided directly upon the surfaces of arms 12 and 14 so that arms 12 and 14 may be used to measure distances as well. Adjoining end portions 32 and 34 may be provided with a vernier scale in degrees of angle to permit arms 12 and 14 to be used to precisely measure angular relationships between intersecting surfaces or markings on one surface.

With respect to materials, arms 12 and 14 may be constructed of wood, aluminum, steel, plastic or any other suitable material. Handle 24 also may be constructed of a wood or aluminum, steel or plastic. Slide 16 is preferably constructed of steel or aluminum. For reference purposes, examples of the dimensions of various parts of this invention are set forth. It is to be understood that by providing such examples, the scope of the invention is in no way limited. The arms 12 and 14 are typically rectangular in shape and have a width of ¾" (1.905 cm) and a depth of ⅝" (1.588 cm) and a length of typically 23¾" (60.325 cm). Slidable portion 44 is typically three inches (7.62 cm) long and clips 36 are typically one inch (2.54 cm) wide. Slide portion 44 may be extended such that the distance from portion 32 on arm 14 to heel 20 is typically 38" (96.52 cm). Handle 24 typically has a length of three inches (7.62 cm).

In view of the above description, it is likely that modifications and improvements will occur to those skilled in the art which are within the scope of the invention.

What is claimed is:

1. A measuring tool comprising:
 a first member adapted for measuring distances between opposed surfaces, and including a captive slide formed as an extension thereof and extensible outwardly from a second end thereof in a direction away from a first end;
 a second member secured at one end thereof to said first end of said first member, said second member being adapted to be pivoted within predetermined limits about said first end of said first member to form an angle with respect to said first member to thereby permit the measurement of angles formed by intersecting surfaces;
 a beveled heel disposed on the distal end of said slide and being spring biased away from said first end, said beveled heel being momentarily retractable toward said first end a predetermined distance upon the longitudinal application of force thereto to permit disengagement of said beveled heel from one of said opposed surfaces;
 tensioning means for urging surfaces on said first end against surfaces on said one end to prevent angular movement between said first member and said second member and to thereby permit the transfer of an angular measurement therebetween to a workpiece;
 retaining means for securing said slide in a selected position to permit the transfer of a measurement of a distance by said first member to a workpiece;
 means permitting said second member to be attached in a measuring position to one of said opposed surfaces;
 a plurality of clips slidably disposed on a side of said second member substantially parallel to one of said opposed surfaces when said second member is in a measuring position, said clips being adapted to be slid parallel to said side and to project beyond said second member in such a manner as to permit desired alignment of said second member along said one edge of said workpiece, each of said clips being captured within a channel formed in said side of said second member, said channel having walls overlapping portions of said clips, each of said clips comprising:
 a depression formed on surfaces of said clip confronting surfaces of said channel substantially parallel to said side and having a shape elongated substantially parallel to a direction in which said clips are adapted to be slid; and
 a spring captured between said parallel surfaces of said channel and surfaces in said depression;
 said spring being operable to urge said clip outwardly away from said side and against said overlapping walls, thereby preventing said clip from sliding without the application of a predetermined external force thereto; and
 said spring and said depression cooperating to restrict the distance said clips are permitted to be slid to an amount equal to the elongated dimension of said depression.

2. The measuring tool of claim 1 wherein said tensioning means comprises:
 a pin interconnecting said first end and said one end;
 means securing one end of said pin to one of said first end and said one end;
 disc means securing another end of said pin to the other of said first end and said one end and having a first inclined cam surface formed thereon;
 a lock washer disposed adjacent said disc means and having a finger anchoring said lock washer in a fixed relationship to the other of said first end and said one end, said lock washer having a second inclined cam surface adapted to cooperate with said first cam surface; and
 a handle member attachable to said disc means and adapted to rotate said disc means in one direction with respect to said lock washer to cause said first cam surface to ride along said second cam surface in one direction and to rotate said disc means in another direction with respect to said lock washer to cause said first cam surface to ride along said second cam surface in another direction to release tension on said first end against said second end.

3. A carpentry measuring tool adapted for fitting a door to an existing door frame and comprising:

a first arm having at least one planar surface formed thereon and adapted for placement in a measuring position for determining interior distances between opposite sides of a door frame;

a second arm pivotally secured at one end thereof to a first end of said second arm, said second arm being pivotable within predetermined limits with respect to said first arm to form an angle therewith to thereby permit the measurement of an angle formed by interior intersecting surfaces of a door frame;

a captive slide, one surface of which is formed as an extension of said planar surface, said slide being extensible outwardly from a second end of said first arm away from said first end, said slide being adapted to cooperate with said first arm to measure distances between opposite sides of said door frame;

beveled heel means being disposed on the distal end of said slide and being spring-biased away from said first end, said beveled heel means being momentarily retractable a predetermined distance toward said first end to permit said first arm to be removed from said measuring position wherein said beveled heel tightly abuts one of said opposite sides;

first tensioning means engaging said one end and said first end for retaining said first arm and said second arm in a fixed angular relationship to permit the transfer of a measured angle between said intersecting surfaces of said door frame to a door to be mounted therein;

second tensioning means for retaining said slide in a desired extended measuring position to permit the transfer of a measured distance between said opposite sides of said door frame to said door to be mounted therein;

nail means for securing said second arm to one of said opposite sides of said door frame;

a plurality of clips slidably mounted into grooves formed in said second arm on a surface thereof parallel to one of said opposite sides when said second arm is in said measuring position, each of said plurality of clips being captured within one of said grooves and being spring-biased outwardly away from said surface against overlapping portions of said groove, said plurality of clips being extensible to project beyond said second member in a direction substantially parallel to said surface to permit an alignment of said second member parallel to an edge of said door such that said surface is positioned beyond said edge a predetermined distance, said predetermined distance being equal to the difference between the width of said door frame and the width of said door necessary to permit said door to operate freely within said door frame when mounted therein.

4. The measuring tool of claim 3 wherein said nail means comprises:

an elongated nail extending through a channel within said second arm and having a head portion projecting from a surface opposite said surface and a pointed portion projectable from said surface;

a retaining disc extending radially outwardly from said nail within said channel;

a retaining disc extending radially outwardly from said nail within said channel;

a spring means within said channel captured between said disc and said opposite surface, said spring means being operable to urge said nail into a position wherein said head portion projects from said opposite surface and said pointed portion does not project beyond said surface;

a first shoulder at one end of said channel adjacent said surface; and a second shoulder at another end of said channel opposite of said one end and adjacent said opposite surface;

said head portion being adapted to receive a force urging said nail toward said surface and thereby driving said pointed portion into a confronting side of a door frame; and said spring means being operable to return said nail to said position when said pointed portion is withdrawn from said confronting side.

5. A measuring tool comprising:

a first member adapted for measuring distances between opposed surfaces, and including a captive slide formed as an extension thereof and extensible outwardly from a second end thereof in a direction away from a first end;

a second member secured at one end thereof to said first end of said first member, said second member being adapted to be pivoted within predetermined limits about said first end of said first member to form an angle with respect to said first member to thereby permit the measurement of angles formed by intersecting surfaces;

a beveled heel disposed on the distal end of said slide and being spring biased away from said first end, said beveled heel being momentarily retractable toward said first end a predetermined distance upon the longitudinal application of force thereto to permit disengagement of said beveled heel from one of said opposed surfaces;

retaining means for securing said slide in a selected position to permit the transfer of a measurement of a distance by said first member to a workpiece; and tensioning means for urging surfaces on said first end against surfaces on said one end to prevent angular movement between said first member and said second member and to thereby permit the transfer of an angular measurement therebetween to a workpiece, said tensioning means comprising:

a pin interconnecting said first end and said one end;

means securing one end of said pin to one of said first end and said one end;

disc means securing another end of said pin to the other of said first end and said one end and having a first inclined cam surface formed thereon;

a lock washer disposed adjacent said disc means and having a finger anchoring said lock washer in a fixed relationship to the other of said first end and said one end, said lock washer having a second inclined cam surface adapted to cooperate with said first cam surface; and a handle member attachable to said disc means and adapted to rotate said disc means in one direction with respect to said lock washer to cause said first cam surface to ride along said second cam surface in said one direction and to rotate said disc means in another direction with respect to said lock washer to cause said first cam surface to ride along said second cam surface in said another direction to release tension on said first end against said second end.

* * * * *